Feb. 16, 1965    B. H. PIERCE    3,169,683
METHOD OF BREAKING GLASS BY IMPACTING THE
SURFACE OPPOSITE A PRE-SCORED LINE
Filed Oct. 6, 1964    2 Sheets-Sheet 1
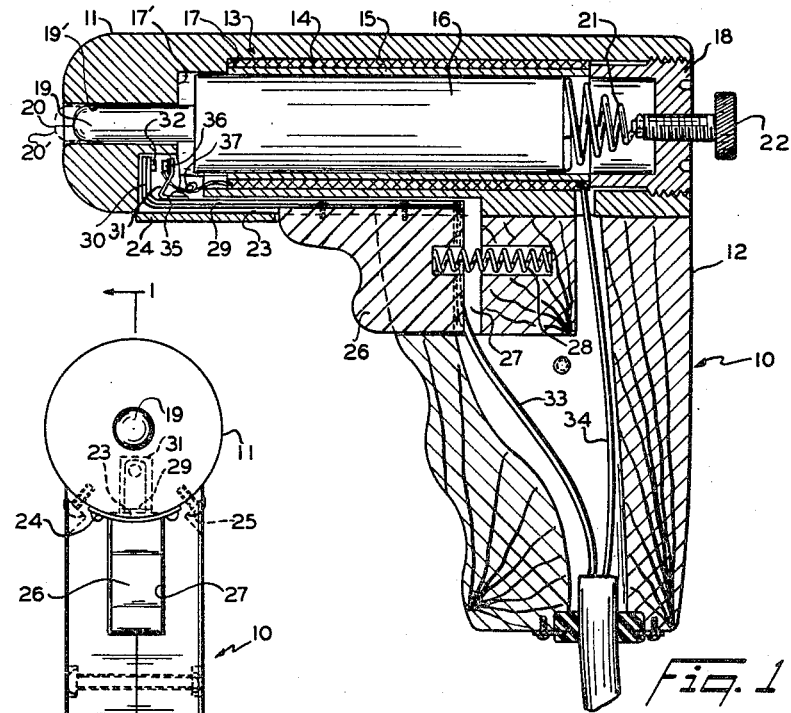
Fig. 1
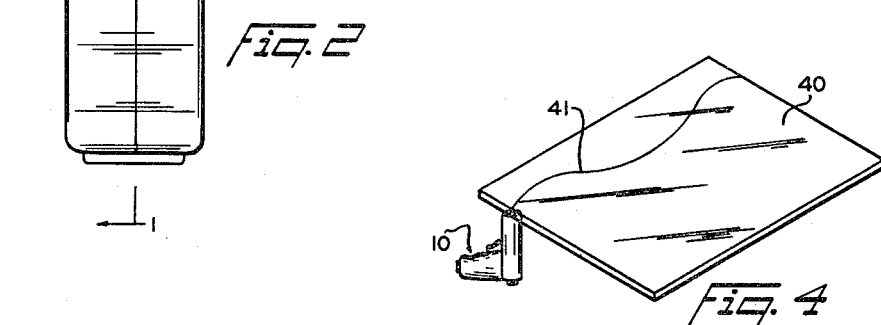
Fig. 2
Fig. 4
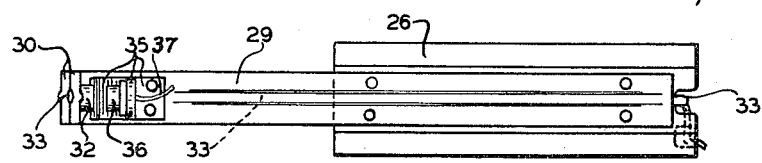
Fig. 3
INVENTOR.
BURDETTE H. PIERCE Feb. 16, 1965   B. H. PIERCE   3,169,683
METHOD OF BREAKING GLASS BY IMPACTING THE
SURFACE OPPOSITE A PRE-SCORED LINE
Filed Oct. 6, 1964   2 Sheets-Sheet 2
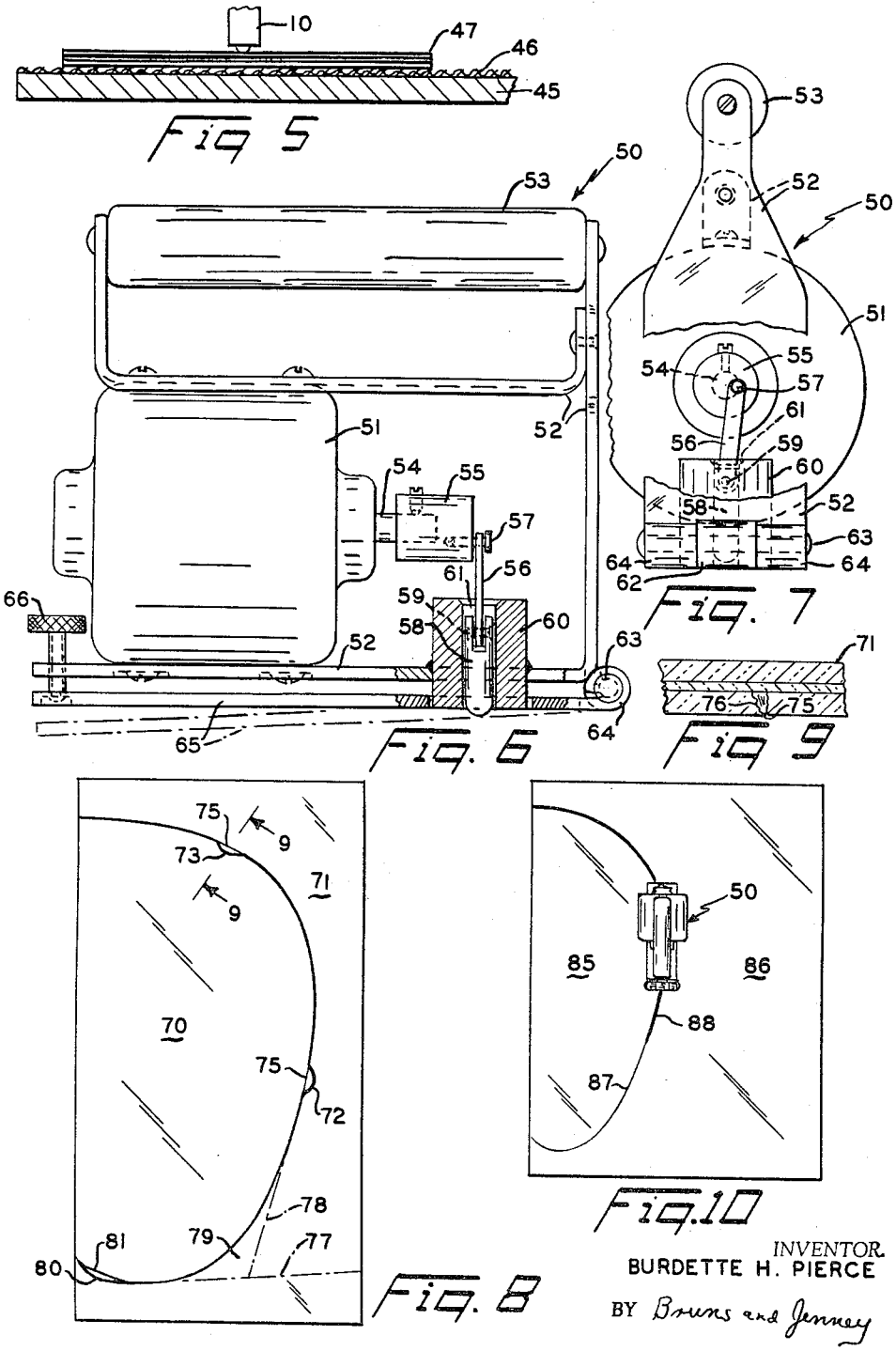
INVENTOR.
BURDETTE H. PIERCE
BY Bruns and Jenney
Att'ys.

United States Patent Office 3,169,683
Patented Feb. 16, 1965

3,169,683
METHOD OF BREAKING GLASS BY IMPACTING THE SURFACE OPPOSITE A PRE-SCORED LINE
Burdette H. Pierce, Bouckville, N.Y.
Filed Oct. 6, 1964, Ser. No. 403,445
1 Claim. (Cl. 225—2)

This invention is a continuation-in-part of co-pending application Serial No. 194,742, filed October 2, 1961, now abandoned.

The invention relates to glass-cutting and more particularly to an improved method and means for breaking a piece of glass which has been scored along a desired line of cleavage by impacting the glass along the line with a portable impactor tool.

In cutting glass along a curved or irregular line, it has been the practice to first score one surface of the glass along the desired line of cleavage and then to break off the unwanted glass beyond the line by cracking the glass with a hand hammer by successive blows along the line on the surface opposite the line. Blows delivered on one side or the other of the scored line often leave a scalloped gouge or protuberance on one side or the other of the scored line which has to be ground away.

The principal object of the present invention, therefore, is to provide a method for breaking glass along a pre-scored line of cleavage by impacting the surface opposite this line with a tool wihch may be closely controlled to deliver sharp and rapid blows to the glass precisely opposite the scored line.

Further objects are to provide a portable and easily controlled tool for striking rapid blows on the surface of a piece of glass opposite a pre-scored desired line of cleavage, the intensity of which blows may be controlled, and which tool may be easily guided precisely along said line.

Still further objects and advantages will become apparent from the following description taken in conjunction with the accompanying drawing, in which:

FIGURE 1 is a longitudinal vertical section through an impactor tool according to the present invention;

FIGURE 2 is a front end elevational view thereof;

FIGURE 3 is an enlarged top plan view of the trigger and contact assembly carried thereon;

FIGURE 4 is a perspective view of the tool of FIG. 1 in use;

FIGURE 5 is a diagrammatic side elevational view of another manner of using the tool;

FIGURE 6 is a side elevational view partly in section, of another impactor tool according to the invention, a portion of the tool being shown in section;

FIGURE 7 is an end elevational view thereof, a portion of the frame being broken away;

FIGURE 8 is a diagrammatic plan view of a piece of safety glass cracked along a scored line by conventional means;

FIGURE 9 is an enlarged sectional view on the line 9—9 of FIGURE 8; and

FIGURE 10 is a plan view of the impactor of FIGURES 6 and 7 in use cracking a piece of safety glass along a scored line.

Referring more particularly to FIGURES 1 and 2, the impactor 10 includes a body or barrel portion 11 and a handle or pistol grip 12. Barrel 11 is hollow and contains a solenoid 13, the coil of which is diagrammatically represented at 14. Solenoid 13 has the usual brass tube 15 in which the core 16 is slidable, and coil 14 and tube 15 are held in place against shoulder 17 by a threaded end cap 18. Shoulder 17 is slightly to the rear of shoulder 17′ which provides a forward stop for the core 16. Core 16 is provided with a reduced forward extension 19 which is slidably contained in an axially extending hole 19′ in the forward end of barrel 11. Core 16 and extension 19 act together as a hammer and the extension 19 has a ball point 20 which normally protrudes to a position shown at 20′, the core 16 being urged in this direction by a coil spring 21 engaging the rear end thereof. A tension regulating screw 22, threaded through cap 18, engages one end of spring 21.

The lower portion of barrel 11 is provided with a longitudinally extending slot 23, covered at 24, and the handle or pistol grip 12 is secured to the barrel as by screws 25 or otherwise. A trigger 26 is slidably carried in a longitudinally extending slot 27 in the grip 12 and is urged forwardly by a spring 28 as shown.

Secured to the top of trigger 26 is an L-shaped contact carrier 29 slidably contained in the slot 23. The upstanding shorter leg 30 of carrier 29 is contained in a deepened portion 31 of slot 23 and has a contact or point 32 secured thereon. Contact 32 is connected through the contact carrier 29 to one of the lead wires 33 from the electric power source, the other wire 34 being connected to one end of coil 14 as shown. The deepened portion 31 of the slot intersects the core carrying central bore of barrel 11 as shown.

Carrier 29 is preferably made of a non-conducting plastic or similar material and has the wire 33 pressed between two bonded layers of plastic as best seen in FIG. 3. Secured on carrier 29 is a bent leaf-spring contact support 35 which carries a contact 36 which is normally spaced slightly from contact 32. The contact 36 is preferably insulated from spring support 35 and is connected by a wire lead 37 to the other end of coil 14 as shown.

The operation of impactor 10 will now be apparent. The hammer member 16, 19 is reciprocable from a withdrawn position as shown in FIG. 1 to a normal extended position, biased by spring 21, in which the ball point 20 extends or protrudes a fractional part of an inch beyond the end of barrel 11. The end 30 of carrier member 29 is normally biased by spring 28 against the end of the extension 31 of slot 23, contacts 32 and 36 being spaced apart. When trigger 26 is moved inward in its slot 27, the spring contact carrier 35 is moved rearwardly against core 16 and contact 36 is moved on its spring support into engagement with the contact 32. The trigger slot 27 is made just long enough so that when contacts 32 and 36 are moved to their rearward or "on" position the core will close the contacts and press contact 36 against contact 32 on its slightly flexible support 30.

When the contacts are closed, current passes through the field coil 14 of the solenoid causing core 16 to be withdrawn and consequently the hammer ball point 20 is also withdrawn inside barrel 11. When the core is withdrawn, contact 36 on its spring support moves rearward and the electrical connection to the solenoid is broken allowing spring 21 to again push the core 16 forward and again close the contacts. A rapid reciprocal movement of the core results, and the ball point 20 is capable thereby of delivering a rapid series of blows to a sheet of glass when the end of tool 10 is held thereagainst as shown in FIG. 4.

Upon release of the trigger 26, the spring 28 returns contact support 29 forward, carrying the spring contact support 35 out of the path of core 16 and automatically breaking the electric connection to the coil 14.

The subject novel method of cutting glass will now also be apparent. A sheet of glass 40 (FIG. 4) is first scored on the top surface in the usual manner with a sharp "glass cutter" along the desired line of cleavage 41. The impactor 10 is then held against the under surface of the sheet 40 with the ball point 20 of the hammer directly under the scored line. The point 20 is normally in its extended position 20′ so that accurate alignment of the point with line 41 is facilitated. The trigger is then retracted and a rapid series of blows is delivered to the glass by the point 20 of the hammer.

The tension regulating screw 22 is easily tightened to increase the tension on spring 21 for increasing the force of the blows delivered by the ball point 20 of the hammer for comparatively thick glass and may be backed off again for thinner glass.

The tool 10 is light and maneuverable and may be easily and rapidly guided along line 41 while delivering its short-stroked vibratory impacting blows to the glass. This progressive vibratory impacting of the glass along the scored line cracks the glass along the line of cleavage and leaves no large scalloped protrusions or gouges such as are usual with the hammering of the glass using a hand hammer.

In FIGURE 5, a conventional table top 45 is shown covered with a thick resilient cloth layer as is usual in glass cutters' tables. A sheet of laminated or automobile safety glass 47, comprised of two outer layers of glass bonded together with a central layer of plastic, is shown on the table. The glass 47 is first scored along the desired curved line and then turned over. The impactor tool 10 is then turned on and run so that its ball point 20 passes along the scored line. The glass is then scored along the same line on the opposite surface, again turned over, and the now-under layer cracked by running the tool 10 along the surface opposite the scored line.

A thin razor or knife is then run along the resulting crack to cut the central layer of plastic to completely sever the portions of glass on either side of the now cracked line. Alternatively the glass may be first heated by any conventional means to stretch the central layer before cutting it with the knife.

Whether the glass is plate glass or laminated glass, the essential operation performed by the tool 10 is the cracking of the glass along the scored line. The operation of tool 10, for laminated glass, is simply repeated for the second layer of glass after the first layer has been cracked.

In FIGURES 6 and 7 a modified form of impactor tool 50 is shown comprising an electric motor 51 mounted on a frame 52 and having a handle 53. The motor shaft 54 has secured thereto an end cap 55 to the outer end of which one end of a link 56 is rotatably secured by a headed pin 57. The pin 57 is offset from the axis of rotation of the cap 55, as shown in FIG. 7 and the other end of the link 56 is rotatably secured in the slotted end of a hammer member 58 by another pin 59.

A tubular guide member 60 is secured in the frame 52 and the hammer 56 is guided for reciprocatory motion in the central passage 61 through guide member 60. The ball-pointed end of hammer 56 projects from the guide member 60 a short distance when in its extended position as shown in FIGURE 6.

Adjacent the guide member and remote from the motor, a central tongue 62 is struck from the frame 52 and bent to form a hinge portion whose pin 63 is supported therein. Hinge portions 64 on either side of the portion 62 extend to form a regulator plate 65 beneath the frame 52 hingedly carried on the pin 63.

At the other end of the device a regulator screw 66 is threaded in frame 52 and rotatably secured in the plate 65. A clearance hole 67 in plate 65 for a guide member 60 permits the plate 65 to be adjusted from the position shown in FIGURE 6 in full lines to that shown in broken lines.

In operation the impactor 50 can be placed on a sheet of glass with the hammer member 58 over a scored line. When the motor 51 is turned on the hammer 58 will deliver a series of rapidly reciprocating blows against the surface of the glass. By turning the screw 66 one way or the other frame 52 and guide member 60 can be moved toward or away from the regulator plate 65 to regulate the force of the blows struck by the hammer 58 against the surface of the glass.

It will be noted that in the extended position, shown in broken lines in FIGURE 6, the plate 65 will adjust the hammer 58 so that it cannot strike the glass and the hammer 58 is considerably closer to hinge 62–64 than the regulator screw 66. A small adjustment of the regulator screw will therefore result in an even smaller adjustment of the hammer in extended position with respect to the glass. The resulting impact of hammer on glass, accordingly, can be adjusted by small increments from an almost imperceptible blow to blows of considerable force.

In FIGURE 8 is illustrated a portion 70, representing an automobile ventilator window, being broken from a piece of glass 71 by a hand hammer. At 72 and 73, respectively, a scalloped protrusion and gouge are shown, caused by tapping the glass on one side or the other of the scored line. In FIGURE 9 the shape of the scallop is shown in section. Apparently the blow delivered to the left of the scored line 75 causes the fracture at the point of impact of the hand-held hammer to run along the line 76 from the left down to the scored line. This holds true for ordinary glass, but perhaps to a lesser degree than for laminated glass, since in laminated glass the force of the blow is greater as it must be delivered through the upper layer to the lower layer.

It will be noted that the gouged scallops 73 are more difficult and time-consuming to remove than the protruding scallops 72 since the whole curved edge of the window 70 on either side of the gouge must be ground away to eliminate the gouge, while only the protuberance itself must be ground away. Moreover, the grinding belts, on which this grinding is usually done, are expensive and rapidly wear out.

Since it is difficult for anyone but an expert to crack glass by hand along a curved scored line which extends for a considerable distance, it is a frequent practice to crack the glass along preliminary scored cracking lines tangent to the curved final scored cracking line 75 such as indicated at 77 and 78 by broken lines in FIGURE 8. First the line 77 is scored and the glass along the curved line at the bottom of FIGURE 8 and along line 77 is cracked. Then the line 78 is scored and the glass is cracked along the curved line at the top of FIGURE 8 and along line 78. This leaves a generally triangular unwanted portion 79 which must be broken off by cracking with a hammer or by breaking off with broad-nosed pliers.

A curved line ending in a sharply curved portion, such as indicated at 80 in FIGURE 8, is especially difficult to crack with a hand hammer. Unless very carefully done, a crack such as indicated at 81 may appear inside the curve at the corner.

When the impactor 10 or 50 is used, however, the scalloped aberrations and cracks across corners are easily prevented. By proper regulation of the force of the rapidly reciprocating pointed hammer, the crack can be made to progress along the scored line at a fixed distance ahead of the impactor as it is moved along the scored line.

In FIGURE 10 a portion 85 of a sheet 86 of laminated glass is shown being cracked by the impactor 50 along the scored line 87. The crack 88 is shown in heavy lines proceeding along ahead of the tool 50 precisely along the scored line 75 as the tool is manually moved along the line. Whether or not the accuracy with which the hammer 58 of the tool may be manually guided with respect to the line 75 is the cause of the precision with which the crack follows the scored line is not known. More likely, the rapid impacts of the pointed hammer 58 set up vibratory stresses in the glass which cause the crack to follow true along the scored line.

It will be apparent, however, that the use of a mechanically operated, manually guided impactor described above, not only eliminates flaws in the edge of a piece of glass cut along a curved line, but also enables a worker who is not skilled in glass-cutting to cut glass along a curved line with satisfactory results.

As will be apparent to those familiar with the art, the invention may be embodied in other specific forms without departing from the spirit or essential characteristics thereof. The embodiments disclosed are therefore to be considered in all respects as illustrative rather than restrictive, the scope of the invention being indicated by the appended claim.

What is claimed is:

A method of cracking glass along a curved line without serious flaws comprising the steps: first, scoring one surface of the glass along the desired curved line, then driving a pointed hammer in reciprocating strokes of mechanically controlled intensity against the opposite surface of the glass, said hammer being mechanically guided in strokes substantially normal to said opposite surface, and at the same time manually guiding said hammer along said line while maintaining said glass in a plane mechanically spaced with respect to the reciprocatory path of the moving hammer so that the hammer always strikes the glass with the same regulated intensity, whereby said glass is subjected to rapid blows of the hammer of controlled intensity at successive narrowly-spaced points on said opposite surface along said scored line.

References Cited by the Examiner
UNITED STATES PATENTS

| | | | |
|---|---|---|---|
| 1,660,323 | 2/28 | Brown | 225—103 |
| 1,836,393 | 12/31 | Reece | 225—96.5 |
| 2,052,243 | 8/36 | Ostermier | 225—2 |
| 2,774,188 | 12/56 | Jordan | 225—96.5 |

ANDREW R. JUHASZ, *Primary Examiner.*